(12) United States Patent
Honkanen et al.

(10) Patent No.: US 7,194,022 B2
(45) Date of Patent: Mar. 20, 2007

(54) METHOD AND SYSTEM HAVING CAPACITY-DEPENDENT BASEBAND GAIN AND COVERAGE-CAPACITY SWAPPING IN A MULTI-CARRIER BASE STATION TRANSMITTERS

(75) Inventors: Mauri Honkanen, Tampere (FI); Andre Dekker, Oulu (FI); Stephen Wasko, Basingstoke (GB)

(73) Assignee: Nokia Corporation, Espoo (FI)

( * ) Notice: Subject to any disclaimer, the term of this patent is extended or adjusted under 35 U.S.C. 154(b) by 915 days.

(21) Appl. No.: 10/163,606

(22) Filed: Jun. 7, 2002

(65) Prior Publication Data

US 2003/0227964 A1 Dec. 11, 2003

(51) Int. Cl.
*H04L 25/00* (2006.01)

(52) U.S. Cl. ............... 375/216; 375/295; 375/345; 455/91; 455/232.1

(58) Field of Classification Search ........... 375/260, 375/142, 297, 130, 284, 342, 240.03, 222, 375/295, 216, 345; 330/254; 455/127.1, 455/232.1, 501, 91; 332/115; 370/208, 370/210
See application file for complete search history.

(56) References Cited

U.S. PATENT DOCUMENTS

| | | | |
|---|---|---|---|
| 5,615,227 A * | 3/1997 | Schumacher et al. | 375/142 |
| 5,937,011 A * | 8/1999 | Carney et al. | 375/297 |
| 6,449,303 B2 * | 9/2002 | Hunton | 375/130 |
| 6,526,102 B1 * | 2/2003 | Piirainen | 375/297 |
| 6,535,564 B1 * | 3/2003 | Mandyam | 375/353 |
| 6,570,929 B1 * | 5/2003 | Eriksson | 375/260 |
| 6,810,027 B1 * | 10/2004 | Posti | 370/311 |
| 6,985,533 B2 * | 1/2006 | Attallah et al. | 375/260 |
| 2003/0064737 A1 * | 4/2003 | Eriksson et al. | 455/501 |

* cited by examiner

Primary Examiner—Temesghen Ghebretinsae
(74) Attorney, Agent, or Firm—Squire Sanders & Dempsey L.L.P.

(57) ABSTRACT

The invention is a method and transmission system which transmits an analog composite signal, including carriers which are respectively modulated with different digital data signal. A transmission system in accordance with the invention includes a signal combiner (18), responsive to the digital data signals, which are provided as inputs to the signal combiner, the signal combiner providing an output of a combined digital signal representing combining of the digital data signals; a multiple carrier transmitter (38) which transmits the analog composite signal; a digital to analog converter (20) which converts a composite digital signal input into the analog composite signal, the digital to analog converter having a dynamic range of digital to analog conversion; and a digital scaler (102), responsive to the combined digital signal provided by the signal combiner, which outputs the composite digital signal that is digital to analog converted by the digital to analog converter, the composite digital signal being a function of the combined digital signal provided by the signal combiner and having a controlled magnitude which results in as much of the dynamic range of the digital to analog converter as possible being used during digital to analog conversion of the composite digital signal without clipping the composite digital signal.

64 Claims, 6 Drawing Sheets

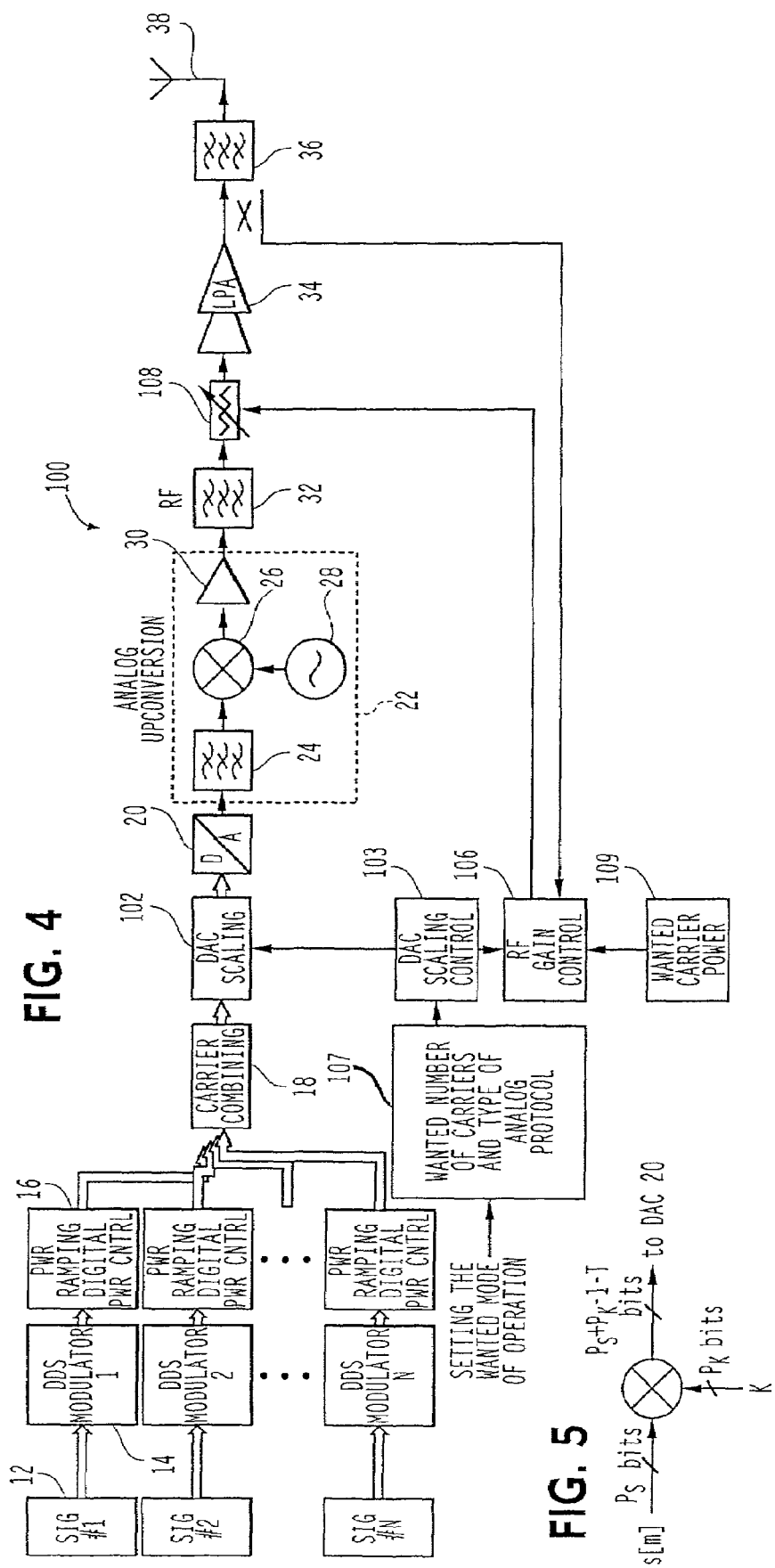

US 7,194,022 B2

METHOD AND SYSTEM HAVING CAPACITY-DEPENDENT BASEBAND GAIN AND COVERAGE-CAPACITY SWAPPING IN A MULTI-CARRIER BASE STATION TRANSMITTERS

BACKGROUND OF THE INVENTION

The present invention relates to multiple carrier transmitters and more particularly, to substantially full utilization of the dynamic range of a digital to analog converter used in a transmitter which converts a combined digital carrier signal into a analog signal without clipping the combined digital carrier signal.

DESCRIPTION OF THE PRIOR ART

A multiple radio covering multiple standards in multiple bands using multiple carriers is a highly sought after transmitter architecture in a cellular base station. Multiple radios promise significant cost savings through component module and platform use and potentially quicker product development because a variety of products can be based on a single radio platform. A multiple radio platform used in a base station can provide an operator with a range of configuration options. Moreover, switching between standards and having the function of transmitting signals with different characteristics, such as enhanced data rates/services for GSM Evolution Enhanced Data, 2.5 G Standard (EDGE) and wideband code division multiple access (WCDMA) simultaneously through a single transmitter is very desirable. In applications requiring switching between standards and/or a number of carriers, the base station is configured on the fly to change the number of carriers, carrier power and modulation format. The capacity and coverage provided by a base station in an application which switches between standards and/or a number of carriers involves changes at will. However, problems occur from the digital to analog conversion which is necessary for converting the digitally formatted, digitally modulated carrier signals into analog for transmission by a transmitter.

FIG. 1 illustrates a diagram of a prior art multiple carrier transmitter of the type used in a base station. The transmitter 10 is a multicarrier transmitter which may be used by any standard, such as GSM, EDGE or WCDMA and has a single transmitter chain producing multiple carriers which are combined in the digital domain. A series of digital signal sources 12 are applied to digital domain signal modulators 14 each operating at a different frequency which produce a carrier signal which is digitally modulated by the digital signal sources. The outputs from the digital domain signal modulators 14 are applied to a digital power control 16 which performs power ramping and digital power control on the digitally modulated carrier signal input thereto and sets a power level in accordance with the desired transmission power of the individual carrier signal relative to the other individual carrier signals. Each of the digitally modulated carrier signals, after appropriate power setting by the digital power control 16, are applied to a digital signal combiner 18 which combines by adding the output signals from the power control circuit together to produce a wideband combined digital output signal representing the combining of the individual digitally modulated carrier signals produced by the digital domain signal modulators 14. The signal combiner 18 outputs a combined digital output signal which is an input to digital to analog converter 20 which may be of a conventional design having a digital to analog conversion range of a selectable range of bits (e.g. 12 to 16 bits). The analog output from the digital to analog converter 20 is applied to an analog up conversion function 22 which includes a filter 24, a mixer 26 driven by an oscillator 28 which produces the required up conversion to transmission frequency and an amplifier 30 which amplifies the mixed output signal produced by the mixer 26. The amplified output signal for an amplifier 30 is applied to an RF filter 32. The output from the RF filter 32 is applied to a series of linear power amplifiers 34 which amplify the signal amplitude to a sufficient level for transmission. The output of the linear power amplifiers 34 is applied to another RF filter 36 and then to antenna 38 which transmits the analog composite signal using the format illustrated in FIG. 2.

GSM and EDGE standards applied to multiple carrier transmission pose difficult requirements regarding the dynamic range of the transmitter 38. The difficulty arises because of the processing bandwidth of the transmitter has to be wide enough to host multiple digitally combined carriers produced by the digital domain signal modulators 14 at arbitrary frequency locations within the wide bandwidth of broadcast. However, the wideband transmitter 38 processing cannot reject noise inside the processing bandwidth by analog filtering. Accordingly, the noise produced by the digital to analog converter 20 is unfiltered at the output of the transmitter 38 as illustrated in FIG. 2.

The signal format of FIG. 2 is unlike traditional narrowband transmitters used at base stations where the carrier is filtered in the IF frequency range with a narrow band filter to reject digital to analog converter noise. Moreover, since the multiple digital carriers produced by the digital domain signal modulators 14 may combine in phase in the time domain, there is a peak to average ratio associated with the signals produced by the signal combiner 18. As a result, a guard band 39 must be left in the upper end of the digital to analog converter 20 dynamic range to reproduce the digital signals faithfully and undistorted in the analog domain as illustrated in FIG. 2. A large dynamic range requirement of the digital to analog converter 20 determined by the difference between an instantaneous maximum signal power and a noise floor is a critical issue in multiple carrier radio transmitter design.

As illustrated in FIG. 2, the individual peaks of the analog signal correspond to the digitally modulated signals produced by the digital domain signal modulators 14. As illustrated in FIG. 2, the guard band 39 allotted between the average carrier power and the peak composite power encompasses a significant portion of the dynamic range of the analog to digital converter 20 and has to be sufficient for the in-phase adding causing the combined signals of the multiple carriers from exceeding the peak P of the transmitter.

There are three measurements in peak, composite GSM based transceiver station approval tests which involve the transmitter's dynamic range illustrated in FIG. 2: (1) wideband noise measurement, (2) intrabase transceiver station intermodulation measurement, and (3) switching transient measurements.

Furthermore, GSM and EDGE standards do not specifically address multiple radio or even multiple carrier operation. In the case of a multiple carrier transmitter and an unfavorable interpretation of the GSM or EDGE standards, wideband noise measurement results in rapidly increasing dynamic range demands as the number of carriers is raised. Since wideband noise is measured with a single full power carrier, a traditional base transceiver station, which combines at the transmitter outputs, experiences an elevated noise floor in normal operation due to noise. In the case of a multicarrier approach, the base transceiver station has the same noise floor irrespective of the number of carriers due to the unfiltered noise floor (e.g. due to digital to analog conversion) if digital to analog conversion scaling is not used to optimize the utilization of the dynamic range.

Since multiple radio enables on the fly capacity changes by switching off carriers, constant digital modulator output levels do not use the dynamic range of the digital to analog converter efficiently. If the carrier input levels to the digital to analog converter are fixed based on the maximum number of simultaneous carriers, some digital to analog converter dynamic range is wasted when the number of carriers is smaller than the maximum. This occurs as a result of the composite peak power of a smaller number of carriers never achieving levels needed to reproduce a maximum number of carriers in an undistorted manner.

FIG. 3 illustrates FIG. 4 from U.S. Pat. No. 6,256,502, entitled "Wideband Multicarrier Power Control for a Cellular PCS Base Station Transmitter". FIG. 3 illustrates a digital power control circuit 50 and a digital combine circuit 60 which control an amount of attenuation of digital input signals to the digital to analog converter 70 and an amount of amplification of an analog output signal from the digital to analog converter. The digital power control circuit 50 comprises a register 56 and a multiply circuit 58. The digital combine circuit 60 comprises a digital summer 62 and a compare circuit 64. Microcontroller 72 is responsive to a signal generator 40 which provides an input signal to register 56 and controls the multiply circuit 58.

The digital power control circuit 50 receives the digital signal generated by the signal generator 40. The digital signal is typically of a serial format although the digital power control circuit 50 may be designed to accept parallel signals. The serial digital signal is placed into register 56 to convert the signal to a parallel format in the form of a word of data. The number of bits in the register 56 (and the data word) equals or exceeds the bit resolution of the digital to analog converter 70 which is typically from 8–14 bits in PCS base station applications. The multiply circuit 58 receives the data word from the register 56 and also receives another word representing the digital attenuation value from the microcontroller 72. The multiply circuit 58 multiplies the digital word from the register 56 with the digital attenuation value to produce an attenuated digital signal. It should be noted that the digital attenuation value, supplied by the microcontroller 72, usually results in the amplitude of the digital signal being reduced although the digital signal may be increased.

The digital summer circuit 62 receives the output from the multiply circuit 58 representing the attenuated digital signals and also receives the outputs from similar multiply circuits of power control circuits from channels 2 and 3. The summer circuit 62 sums all of the inputs from the multiply circuits to produce a combined digital signal for input to the compare circuit 64. The compare circuit 64 receives the combined digital signal from the summer circuit 62 and receives another input from the microcontroller 72 representing a maximum amplitude value. Compare circuit 64 compares the combined digital signal from the summer circuit 62 with the maximum amplitude value from the microcontroller 72. If the combined digital signal is less than or equal to the maximum amplitude value, the output from the compare circuit 40 is equal to the input value of the combined digital signal. However, if the combined digital signal is greater than the maximum amplitude value, the output from the compare circuit 64 is limited to the maximum amplitude value. The compare circuit 64 thus performs a clipping function. The output from the compare circuit 64 is then input to the digital analog converter 70 from digital format to an analog signal. Clipping distorts the combined digital signal.

SUMMARY OF THE INVENTION

The present invention is a transmission system and a method of transmission which transmits an analog composite signal including carriers which are respectively modulated with different digital data signals. A combined digital output signal which is converted from digital to analog representing combining of the digital data signals is controlled in magnitude. The control of the magnitude of the combined digital output signal is made so that as much of the dynamic range of digital to analog conversion of the combined digital signal is used which is practically possible (but not necessarily the maximum) while avoiding clipping of the combined digital output signal by the digital to analog converter. This affords the benefit of allowing the operator of a base station in a wide band multiple carrier environment involving one or more systems, such as GSM or EDGE, to configure a number of channels up to a maximum by permitting a proportionate reduction of the power of the individual channels and also to permit reconfiguration of the transmitter to broadcast fewer carriers at higher power.

The invention maximizes the available dynamic range of the digital to analog converter and utilizes that range to enhance the base station flexibility and reconfigurability by permitting flexible carrier allocation to suit a number of active mobiles to which the base station is transmitting with the power level of the carriers being adjusted to utilize the dynamic range of the digital to analog converter without clipping the composite digital signal which is formed by combining the individual digital carrier signals. The scaling function (adjustment in magnitude) of the composite digital signal is placed in front of the digital to analog converter in the transmitter chain to adjust the signal level of the composite digital signal. The conversion from digital to analog operates as close as possible to the full scale of the dynamic range irrespective of the actual RF output power. When the invention is utilized in a base station, the number of carriers which are supported may be either a permanent reconfiguration or an on the fly configuration. During a change in the configuration of the number of carriers, the single multiple carrier transmitter including the upstream scaling of the combined digital signal permits the number of channels to be increased up to a maximum with the only penalty being a lower power per carrier resulting in coverage and capacity being control variables at the base station.

A transmission system which transmits an analog composite signal, including carriers which are respectively modulated with different digital data signal in accordance with the invention includes a signal combiner, which provides an output of a combined digital signal representing combining of the digital data signals; a multiple carrier transmitter which transmits the analog composite signal; a digital to analog converter which converts a composite digital signal input into the analog composite signal, the digital to analog converter having a dynamic range of digital to analog conversion; and a digital scaler, responsive to the combined digital signal provided by the signal combiner, which provides the composite digital signal that is digital to analog converted by the digital to analog converter, the composite digital signal being a function of the combined digital signal provided by the signal combiner with a controlled magnitude which results in as much of the dynamic range of the digital to analog converter as possible being used during digital to analog conversion of the composite digital signal without clipping the composite digital signal. A plurality of digital modulators may be utilized and each digital modulator may be responsive to a different one of the digital data signals and may provide a digital carrier signal modulated with a different one of the digital data signals and the digital carrier signals may be a function of the digital data signals combined by the signal combiner. A power control may be located between each digital modulator and the signal combiner, which controls a power level of the digital data signals which are provided to the signal combiner for combining thereof which may comprise a multiplier which multiplies the combined digital output signal by a scaling factor. The scaling factor may be less than, equal to, selectively equal to, or greater than one. A bit shifter may scale the combined digital signal by a scaling factor by bit shifting the composite digital signal which may be less than, equal to or greater than one. The controlled magnitude may be a function of at least one of (1) a number of carriers used to transmit the digital data signals, (2) characteristics of an analog protocol used to transmit the analog composite signal, or (3) transmission power used for analog composite signal. An attenuator may be coupled to the digital to analog converter and to the transmitter which may provide a controlled level of attenuation of the analog composite signal provided to the multiple carrier transmitter. A digital to analog conversion scaling control may provide a control signal to the digital scaler which causes the composite digital signal to have the controlled magnitude; and a gain control may be responsive to the digital to analog conversion scaling control and to a power level of transmission of the analog composite signal, and may control the controlled level of attenuation of the analog composite signal provided by the attenuator. The control of the level of attenuation by the attenuator provided by the gain control may be by RF gain control and may be a function of a desired power level of the modulated carrier signals; and the digital to analog conversion scaling control control signal may be a function of a modulation format and a number of the carriers which are present in the analog composite signal.

A method of transmitting an analog composite signal including carriers which are respectively modulated with different digital data signals in accordance with the invention includes providing a combined digital signal which is a combination of the different digital data signals; providing a composite digital signal which is a function of the combined digital signal and having a controlled magnitude; converting the composite digital signal from digital to analog which results in as much of a dynamic range of the digital to analog conversion as possible being used during digital to analog conversion of the composite digital signal without clipping the composite digital signal; and transmitting the analog composite signal from a multiple carrier transmitter. Each digital carrier signal may be modulated with a different one of the digital data signals and the digital carrier signals may be a function of the digital data signals which are combined to provide the combined digital signal. A power level of the digital data signals which are combined may be controlled. The controlled magnitude may be provided by multiplying the combined digital output signal by a scaling factor. The scaling factor may be less than, equal to, selectively equal to or greater than one. The controlled magnitude may be provided by bit shifting the composite digital signal which may be less than, equal to or greater than one. The controlled magnitude may be a function of at least one of (1) a number of carriers used to transmit the digital data signals, (2) characteristics of an analog protocol used to transmit the analog composite signal, or (3) transmission power used for analog composite signal. The carriers may be in proportion to a number of active mobiles to which the multiple carrier transmitter is transmitting and may be inversely portional to a power level of transmission of each carrier.

BRIEF DESCRIPTION OF THE DRAWINGS

FIG. 4 illustrates a block diagram of an embodiment of the present invention.

FIG. 5 illustrates a multiplier which may be used as the digital scaler of the embodiment of the invention in FIG. 4.

Like reference numerals identify like parts throughout the drawings.

DESCRIPTION OF THE PREFERRED EMBODIMENTS

Figure 1:
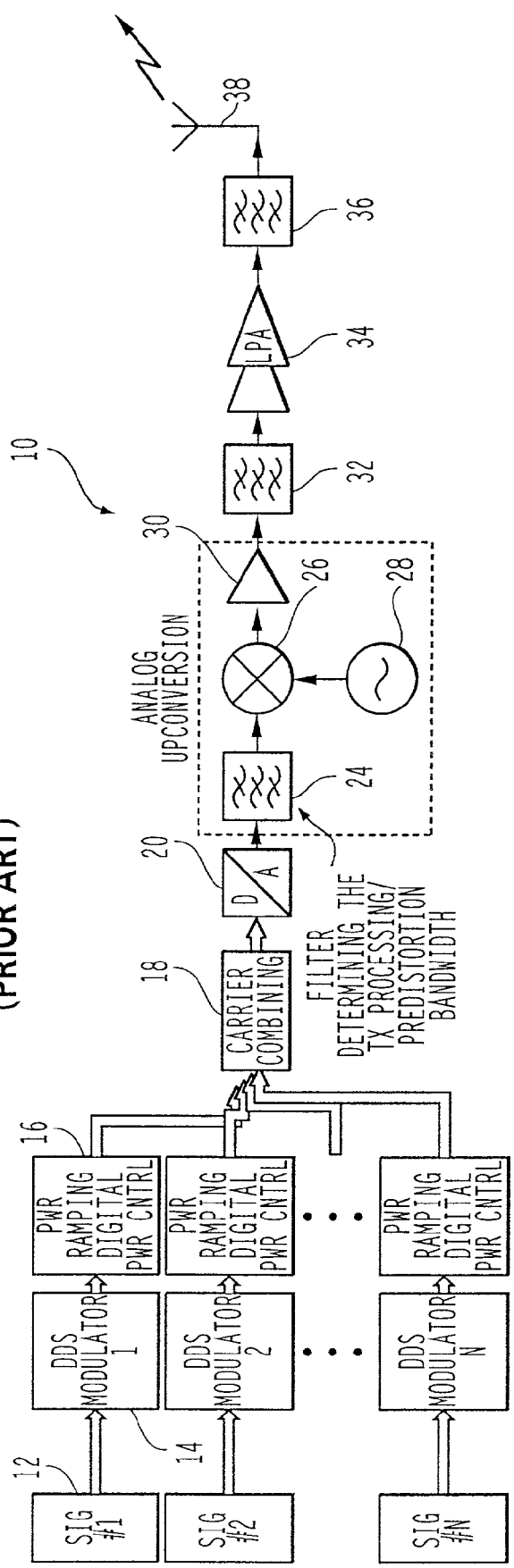
FIG. 1 illustrates a block diagram of a prior art multiple carrier transmitter of the type used in base stations.
Figure 2:
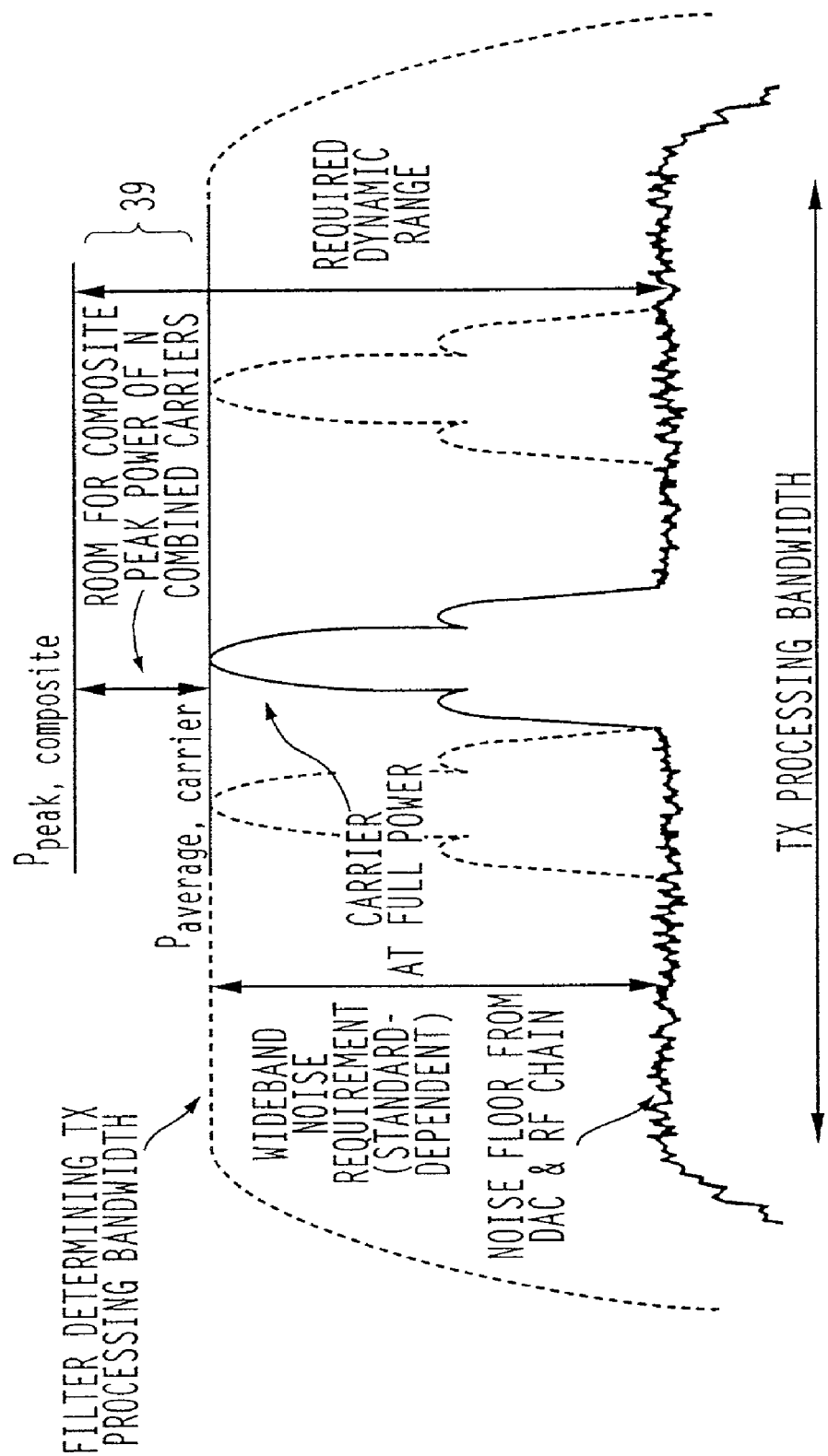
FIG. 2 illustrates the analog composite broadcast signal produced by the transmitter of FIG. 1.
Figure 6:
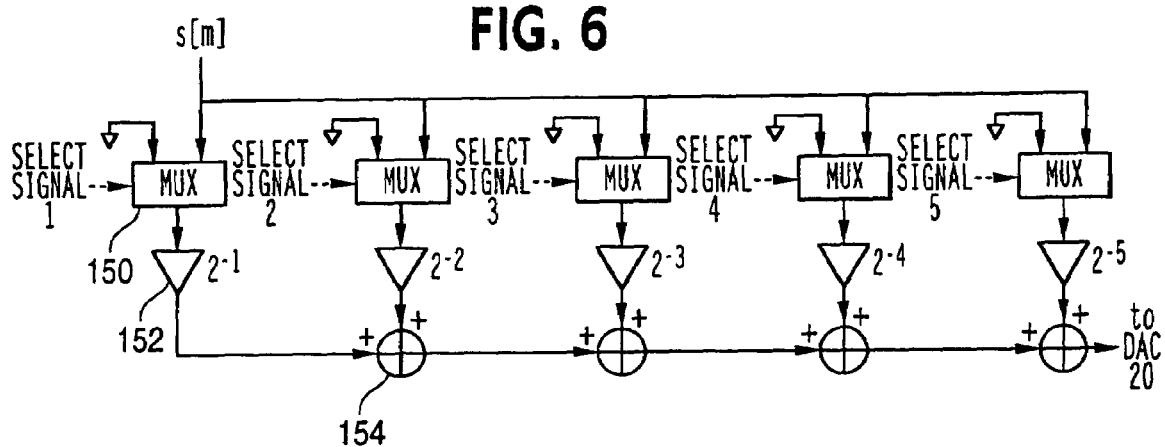
FIG. 6 illustrates a five bit multiplier which may be used as the digital scaler of the embodiment of FIG. 4.

FIG. 4 illustrates a block diagram of an embodiment 100 of the present invention. A digital to analog converter scaling function 102, is placed in front of the digital to analog converter 20 in the transmitter chain to adjust the signal level of the composite digital signal produced by the signal combiner. The scaling function 102 may without limitation be a multiplier, as illustrated in FIG. 5, a five-bit multiplier as illustrated in FIG. 6, a multiplier with a multiplexer bypass in FIG. 7 which permits the multiplication function of FIG. 5 to be selectively disabled so that the input signal to the digital to analog converter 20 is unchanged or a bit shifter 300 as illustrated in FIG. 8. The digital scaler 102 receives as an input the combined digital carrier signals produced by the signal combiner 18. The digital to analog converter 20 has a dynamic range which converts a specified maximum number of bits, such as 12 bits, into the corresponding analog output signal. As described above with respect to the prior art, the digital signals from the digital domain signal modulators 14, when combined by the signal combiner 18, have peaks which can add in phase to exceed the peak output possible to be transmitted by the transmitter 38 without clipping. As a result of the phase adding, a band 39 illustrated in FIG. 2 between the average carrier power and the peak power was built into the operation of the system. This resulted in the full dynamic range of the digital to analog converter 20 not being used because there was no mechanism to scale the input into the digital to analog converter 20. With the invention, the signal combiner 18 provides an output of a combined digital signal representing combining of the digital data signals which is controlled in magnitude by the digital scaler 102 so that the composite digital signal is a function of the combined digital output signal provided by the signal combiner 18 and has a controlled magnitude which uses as much of the dynamic range of the digital to analog converter 20 as possible (but not necessarily the maximum since analog to digital converters function to produce less spurious signals when not operating at their maximum conversion range) during digital to analog conversion of the composite digital signal without clipping the composite digital signal.

Figure 3:
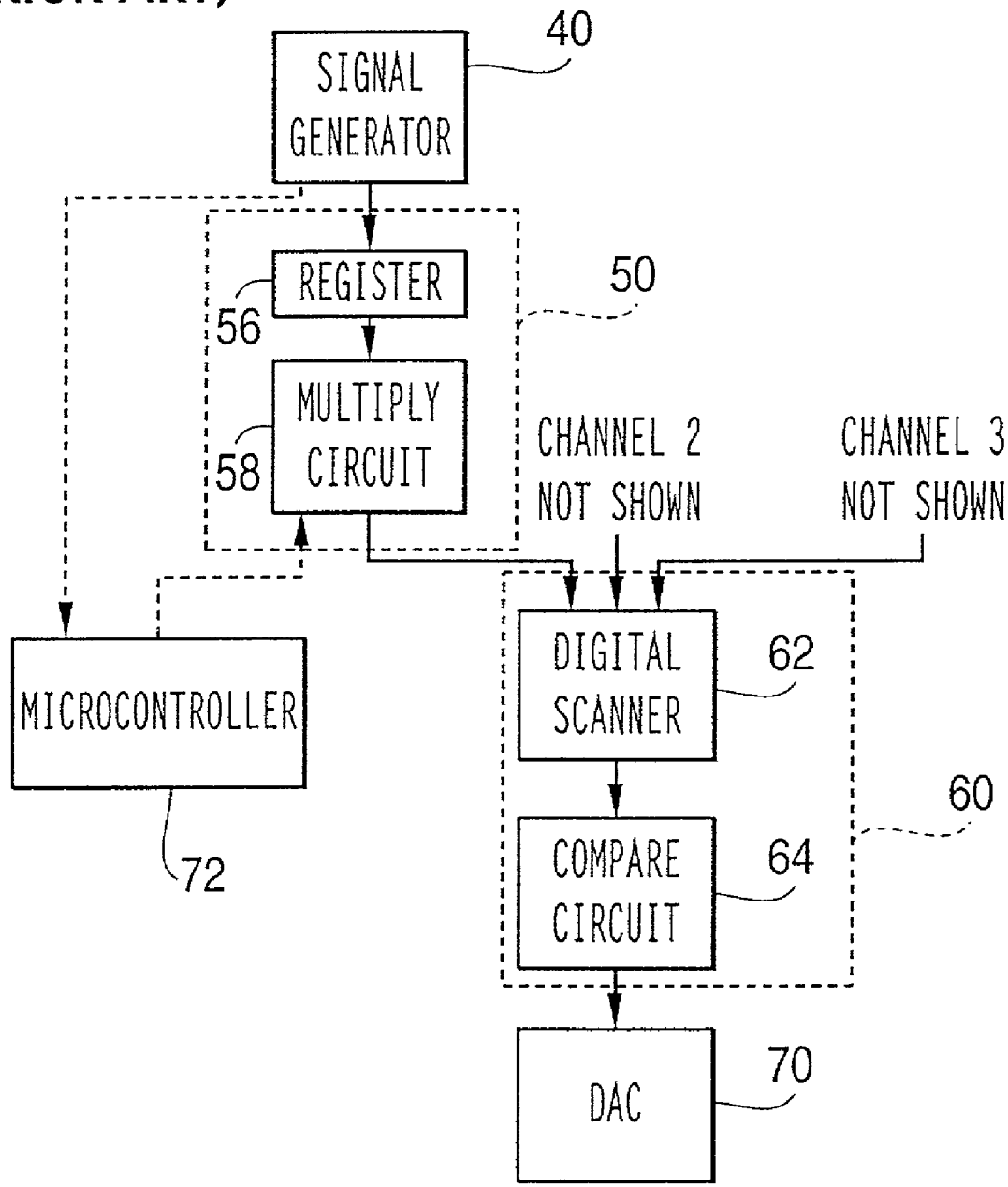
FIG. 3 illustrates a block diagram of a prior art power control of a wide band multicarrier transmitter.

This operation is different than the prior art discussed above with respect to FIG. 3. The prior art of FIG. 3 causes clipping of the combined carrier signal to occur when the overall magnitude exceeds the dynamic range of the digital to analog converter which degrades the signal. The present invention, in contrast to the prior art, uses as much as possible of the dynamic range of the digital to analog converter without exceeding the dynamic range to cause clipping.

The digital scaler 102 is controlled by a digital to analog scaling control 103 which is responsive to a desired number of carriers and a type of analog protocol used for transmission 107, the feedback of the actual power level outputted by the linear power amplifier 34 and the wanted carrier power 109. The digital to analog scaling control 103 also provides an output to an RF gain control 106 which controls RF analog attenuation by an attenuator 108 which may be located in a number of positions in the transmitter chain with the illustration between RF filter 32 and linear power amplifiers 34 being only one example. The RF gain control 106 receives feedback from the output of the linear power amplifiers 34 indicating the RF power used for broadcast by the transmitter 38. The RF gain control signal applied to the attenuator 108 is a function of the control signal produced by the digital to analog scaling control 103 which is a function of the desired number of carriers and a type of analog protocol used for transmission 107, the feedback of the actual power level outputted by the linear power amplifier 34 and the wanted carrier power 109.

Overall, as the number of carriers increases, the amount of power which may be allotted to individual carriers must be decreased so as to fit the total input signal level of the composite digital output signal from the digital scaler 102 to the dynamic range of the digital to analog converter 20. As a result, in a high density area, such as business areas, substantial capacity may be obtained as needed by increasing the number of carriers in a small area to reach more mobiles in a cell or sector and while at night, when there are less active mobiles, the transmission area may be increased by an increase in the broadcast power of a smaller number of carriers. The number of carriers may be proportional to a number of active mobiles and may be inversely proportional to a power level of transmission of each carrier.

The controlled magnitude of the signal produced by the digital scaler 102 results in as much of the dynamic range of the digital to analog converter 20 as possible being used during digital to analog conversion. A maximum analog output signal level from the digital to analog converter 20 is not required, but only a level providing performance of the digital to analog converter within specified limits without clipping the composite digital signal. For simplicity, here it also presumed that the digital to analog converter noise floor level is more or less constant, i.e. independent of the number of carriers.

The maximum acceptable full-scale output power from the digital to analog converter 20 is denoted as 0 dBFS. Assuming that the transmitter 38 transmits four EDGE carriers at full power, a peak-to-average ratio of a single EDGE carrier is 3.2 dB and the peak power of four carriers is 20*log 10(4)=12 dB higher than the average power of a single carrier. Thus, the available average output power per carrier from the digital to analog converter 20 is 0−3.2−12 dBFS=−15.2 dBFS.

Assuming that there is only one carrier needed due to the reduced capacity in the network or if wideband noise measurement is in question, one of the digital modulators produces a full-power carrier while the others are idle. Without any digital scaling provided by the digital scaler 102, the available dynamic range is the same as in the four-carrier case. However, if digital scaling provided by the digital scaler 102 is used, the average output power of the carrier can be increased in the digital domain by 12 dB. There is still enough room for the 3.2 dB signal peaks, but the dynamic range of the signal would be then 12 dB larger. The scaling can be implemented by bit multiplication as described in relation to FIGS. 5–7 or bit shifting in FIG. 8.

Scaling does have an effect on the carrier output power from the digital to analog converter 20. With a constant gain in the analog parts of the transmitter chain, the carrier power at the transmitter 38 output changes proportionally to the scaling provided by the digital scaler. In general, this is not always desired or even possible due to limitations in the linear power amplifiers 34. Therefore, in most cases an analog gain compensation is needed as a function of the digital scaling provided by the digital scaler 102, as shown in FIG. 4. The attenuator 108 between RF filter 32 and the linear power amplifiers 34 is controlled to compensate for the carrier power change that the digital scaler 102 introduces. Normally an attenuator is used to compensate gain variation in a transmitter and implement static power control in GSM/EDGE, so scaling compensation functionality can be combined to the same component and hence no extra components are necessarily needed.

Naturally, as the carrier power increases, the linearity requirements in the analog chain are tightened. However, this is compensated effectively by the smaller amount of carriers, and hence the net effect on the linearity requirements should not be notable.

From a base station point of view, the invention enables installation of the base station and then defining how many carriers are supported, either by a 'permanent' re-configuration or on-the-fly. The invention provides achieving the maximum power possible with any particular configuration so that one multi-carrier transmitter 38 featuring the digital scaler 102 can be post-configured for 'any' number of channels (up to a maximum), but the penalty is lower power per carrier. In effect, coverage is swapped for capacity within one base station. Being able to reconfigure the base station for fewer carriers at more power (and vice versa) is useful in business areas which need substantial capacity in a small area during the day, but are deserted at nights. This reconfiguration is controlled by intelligent common radio resource management.

In operation the control of the number of carriers and the power thereof works as follows. At moment $t_1$ the operator decides that the base station supports at most $N_1$ carriers. The digital scaler 102 is then adjusted so that the baseband peak power corresponds to digital to analog converter 20 full scale range. The RF gain provided by the analog transmitter chain is adjusted in practice by the attenuator 108 to get the desired power levels $P_1$ at the antenna connector. This RF gain can be fixed as long as the number of carriers and the maximum needed power per carrier do not change.

At moment $t_2$ the operator decides that the base station supports at most $N_2$ carriers. The baseband gains are then readjusted so that the baseband peak power corresponds again to digital to analog converter 20 full scale range. The RF gain is readjusted to get the desired power levels $P_2$ at the antenna connector. This RF gain can be fixed as long as the number of carriers and the maximum needed power power carrier do not change.

An example described below is a simplest and least expensive implementation using automatically the full dynamic range of the digital to analog converter 20 and achieves a best possible carrier-to-noise ratios at the transmitter output 38 in all cases. The digital scaler 102 receives the digital multicarrier signal from the digital signal combiner 18. The simplest way to scale the signal is to utilize shifting as illustrated in FIG. 8. However, shifting limits the scaling resolution to 6 dB steps. Other possible ways are, for example, to shift the digital word and then add the original value resulting in three times higher amplitude, or to multiply the signal value with arbitrary value as in FIGS. 5–7 which is the most complex solution.

The scaled signal is presented to the digital to analog converter 20 which produces an analog signal with maximum dynamic range. Since the average carrier power in the output of the digital to analog converter 20 is varying depending on the number of transmitted carriers, compensation for power variation in the transmitter may be needed. The compensation for power variation may be by using control of baseband gain if a complex (IQ) output is generated by the digital to analog converter 20. If an intermediate frequency (not illustrated) is used in the transmitter, control of intermediate gain may be used. In principle, gain compensation can be done anywhere in the analog chain. As illustrated, the attenuator 108 placed in the RF parts of the chain works with the best noise performance but it should be understood that the use of gain control as described above is not limited to the RF part of the transmitter.

From the implementation point of view, it is advantageous to change the scaling function of the digital scaler 102 or the analog gain or attenuation by attenuator 108 only at the moment when a different maximum amount of carrier is needed and/or the coverage range of the base station needs adjustment. Gain changes in the transmit chain interfere with the normal operation of the base station because they generate switching transients and upset a possible adaptive predistortion system. An advantageous implementation is therefore to base the scaling provided by the digital scaler 102 and analog gain 108 on the maximum needed carrier power for the desired coverage area of the base station. In the GSM standards this is called "static power" and in the UMTS standards this is called "maximum output power". The standards require the wideband noise only to be measured at static or maximum output power. Therefore a reduction of the carrier-to-noise ratio is allowed if the dynamic value of the carrier power is below the static or maximum value.

Usually base station transmitters employ internally closed loop gain or power control to stabilize the carrier powers to wanted levels despite gain variations in the chain. The gain control system cannot be designed independently of the digital scaler 102 and the attenuator 108 if an attenuator is used. Ideally the digital scaler 102 and the attenuator 108 form part of the transmit power/gain control system. On a higher level, the number of carriers and transmission powers in a base station are determined by the radio resource management of the network.

FIG. 4 illustrates an up conversion architecture with a real output signal from the baseband. The invention can just as well be applied to baseband with a complex output signal (in-phase and quadrature) that is up converted in a single-sideband mixer or quadrature modulator. There may also be extra up conversion stages in the chain. It is also possible that there is no up conversion at all, if the digital to analog converter 20 is capable of producing high quality signals directly at the RF frequency.

The following example describes one mode of operation of the system 100 of FIG. 4. In order to utilize the whole dynamic range of the digital to analog converter 20 in the case of a single carrier transmission, (digital domain data source modulators 18 (2#s 2–N are switched off)) all of the bits used to represent the modulated carrier signal have to be used in the digital to analog converter 20. Additionally, the digital word representing a peak amplitude of the signal has to be positioned so that the dynamic range of the digital to analog converter 20 is optimized. For simplicity, the assumption is made that the most significant bit (MSB) of the modulated carrier signal is the MSB at the input of the digital to analog converter 20 (in actuality this may not be true). Now in the situation where the number of M signals is equal to 4 so that four carriers are active, a total of P+2 bits are needed to represent the signal. Without scaling between the signal combiner 18 and the digital to analog converter 20, significant distortion takes place because the signal amplitude peaks employing the two MSBs are not produced correctly from the output of the digital to analog converter 20. Therefore, the combined digital output signal from the signal combiner 18 has to be scaled or shifted downwards with a controlled magnitude with that operation being mathematically equivalent to multiplying with a number which is smaller than 1. At this point, if the number of carriers were to be shifted from 4 back to 1, the multiplication would be with the number larger than 1. Accordingly, the overall function of the invention with proper scaling performed by the digital scaler 102 is that a single carrier signal passes through the digital scaler unaffected and when multiple carriers are active, the combined digital output signal produced by the signal combiner 18 is scaled down proportionately in power so as to permit the dynamic range of the digital to analog converter 20 to be effectively used (it is not necessary, although it may be desirable to maximize the use of the dynamic range). Since the word length of a single carrier signal is dimensioned to match the input word length of the digital to analog converter 20, the least significant bits (LSBs) of a multicarrier signal after combining and scaling cannot be used in the digital to analog converter 20. The LSBs are dropped in an appropriate place to fit the signal to the digital to analog converter 20 input. Another option of implementation is that no scaling takes place when the maximum number of carriers are being utilized resulting in the MSB in the output of the signal combiner 18 also being a MSB in the input of the digital to analog converter 20. When the number of carriers is reduced, the combined digital output signal produced by the signal combiner 18 is scaled upwards by the digital scaler 102 in order to achieve the best dynamic range performance in the output of the digital to analog converter 20. Mathematically scaling to increase the signal amplitude may be by multiplying with a number larger than 1 or shifting digits to increase the magnitude. It is necessary to insure that the single carrier signal is represented with an adequate number of bits so that the digital single signal carrier contains enough significant bits after multiplication or shifting to utilize the available dynamic range of the digital to analog converter 20 optimally.

FIG. 5 illustrates in detail a first option of how to perform scaling. In this situation, the M'th signal sample at the input of the digital scaler 102 is s[m] and each sample is described with $P_s$ bits. As illustrated in FIG. 5, a full digital multiplication with the scaling coefficient K acting as a multiplier of $P_k$ bits and $0 \leq K \leq 1$, is the circumstance. K is a constant because the value thereof is changed only when there are changes to the base station mode of operation. This circumstance happens rarely compared to the sample rate of the signal. Full multiplication increases the digital word length of the signal in the case of fixed-point numbers of the signal from $P_s$ to $P_s+P_k-1$ bits. In most situations, the increased word length does not provide any benefit and only creates undesired complexity in implementation. Therefore, the scaled digital signal is truncated to an appropriate length of $P_s+P_k-1-T$ bits where T is the number of abandoned LSB bits.

It should be noted that a fixed point multiplier coefficient is not equal to 1. Therefore, in practical applications, the word length $P_k$ is determined by the fineness of the approximation required in order to maintain the signal s[m] substantially unchanged.

FIG. 6 illustrates a five bit multiplier 140 which provides a scaling factor of $(2^{-1}+2^{-2}+2^{-3}+2^{-4}+2^{-5})=0.97$ with the corresponding decibel value being $20 \cdot \log_{10} (2^{-1}+2^{-2}+2^{-3}+2^{-4}+2^{-5})=0.2$ dB. The multiplier 140 has a multiplexer 150 which selectively passes signal s[m] to an shifter 152 and to a series of adders 154. Therefore a practical scaling accuracy may be achieved in most applications with a four or five bit multiplier. However, it may be desirable to have a multiplier even closer to 1 regarding a full power signal.

Figure 7:
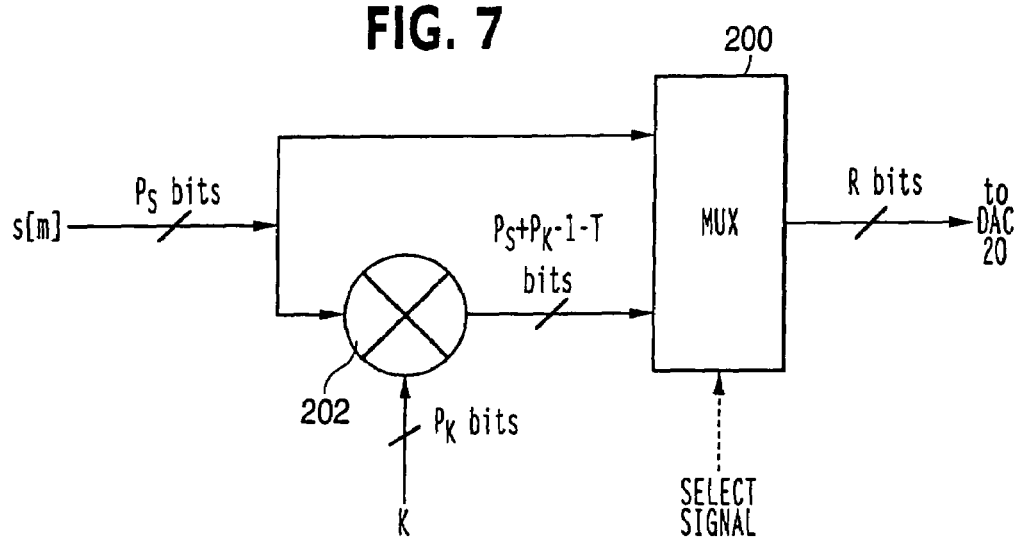
FIG. 7 illustrates a multiplier which permits the digital scaler function to be bypassed to selectively provide a totally unscaled signal to the digital to analog converter of the embodiment of FIG. 4.
Figure 8:
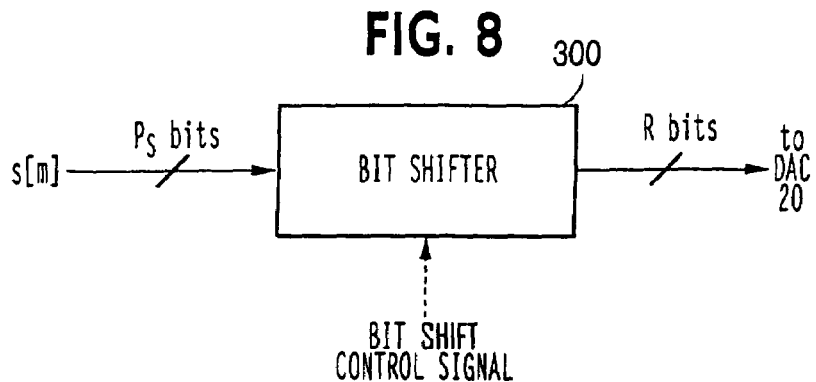
FIG. 8 illustrates a bit shifter which may be used as the digital scaler of the embodiment of FIG. 4.

FIG. 7 illustrates an improved multiplier design in comparison to FIGS. 5 or 6. A multiplexer 200 provides selective bypass of the multiplier 202 which permits an unscaled signal to be outputted in circumstances, such as described above, where the MSBs of a single carrier match the MSB of the full range of the digital to analog converter 20 is required. Selection of word lengths, P, T and R is dependent on the particular design and a required accuracy and dynamic range of the digital to analog converter 20 which is not described in more detail hereinafter.

With respect to multipliers using four or five bits as, for example, illustrated in FIG. 6, it is also possible to drop certain powers of 2 which are not needed to form the required multiplying coefficients which simplifies the design.

FIG. 8 illustrates a bit shifter 300 which scales the input signal of PS bits into an output signal of R bits under the control of a bit shift control signal which is produced by the digital to analog converter scaling control 103. For example, a signal sample s[m] of a length $P_s$ bits comprising bits [$b_0$, $b_1$ ... $b_{P-1}$] where $P_0$ is the MSB. Shifting of the signal power by 6 dB is implemented by moving the bit $b_0$ to the bit $b_1$, bit $b_1$ to the bit $b_2$ ... the bit $b_{P-2}$ to the bit $b_{P-1}$ and substituting 0 for the bit $b_0$. Each shift results in a 6 dB power change in the signal. The limitation of shifting is that it has limited accuracy with power steps of 6 dB being available.

Setting a desired mode of operation for a base station is a part of the overall resource management in a network in which the invention is used. There are network elements that are involved in the process in addition to the base station unit of interest: the Radio Resource Management controller (not illustrated), which controls the overall allocation of radio channels within the network, and the Base Station Controller (not illustrated) or Radio Network Controller (not illustrated) which instructs and allows the base station to change channels or channel allocations.

As an example of the particular invention, consider a case where the transmitter of the multi-carrier base station of interest transmits two modulated carriers. Since the peak-to-average power ratio (PAR) of a two-carrier signals is known apriori because of simulations or measurements, the digital scaler 102 adjusts the composite digital multi-carrier signal level at the input of the digital to analog converter 20 so that the overall dynamic range of the digital to analog converter is maximized and the average output power per carrier in the output of the digital to analog converter is $$P_{avgcarrier}=P_{DAC_{\textit{full-scale}}}-PAR(M_c)-10 \log_{10}(M_c)-C,$$

where $P_{DAC_{\textit{full-scale}}}$ is the full-scale output power of the digital to analog converter, $PAR(M_c)$ is the peak-to-average power ratio of the modulated signal with $M_c$ carriers, and C is constant that can be applied to optimize the digital to analog converter performance. In practice, the digital to analog converter 20 achieves a best dynamic performance with signal levels a bit below the full-scale. The analog gain of the transmitter chain is adjusted to provide the target output power at the antenna connector. The target base station output power can be considered to be the maximum output power per carrier in the WCDMA and the static output power per carrier in GSM/EDGE.

The Radio Resource Management realizes that in the particular cell or sector of the network more capacity is needed. It sends a message to the base station controller/radio network controller/RNC, which instructs the base station to activate two more carriers. The base station activates two more carriers and scales the digital signal at the input of the digital to analog converter 20 based on the equation above. Of course, a different value of $M_c$ is used to calculate the scaling coefficients. Simultaneously, the analog gain is adjusted accordingly to keep the output power at the antenna connector at the target level.

The RF gain control 106 compensates for deviation between the target base station output power and the actual measured RF output power. The flow chart of FIG. 9 described below does not include discussion of RF gain control. The RF gain control has an effect on the gain of the analog transmitter chain and interacts in limited extent with the digital to analog scaling.

Figure 9:
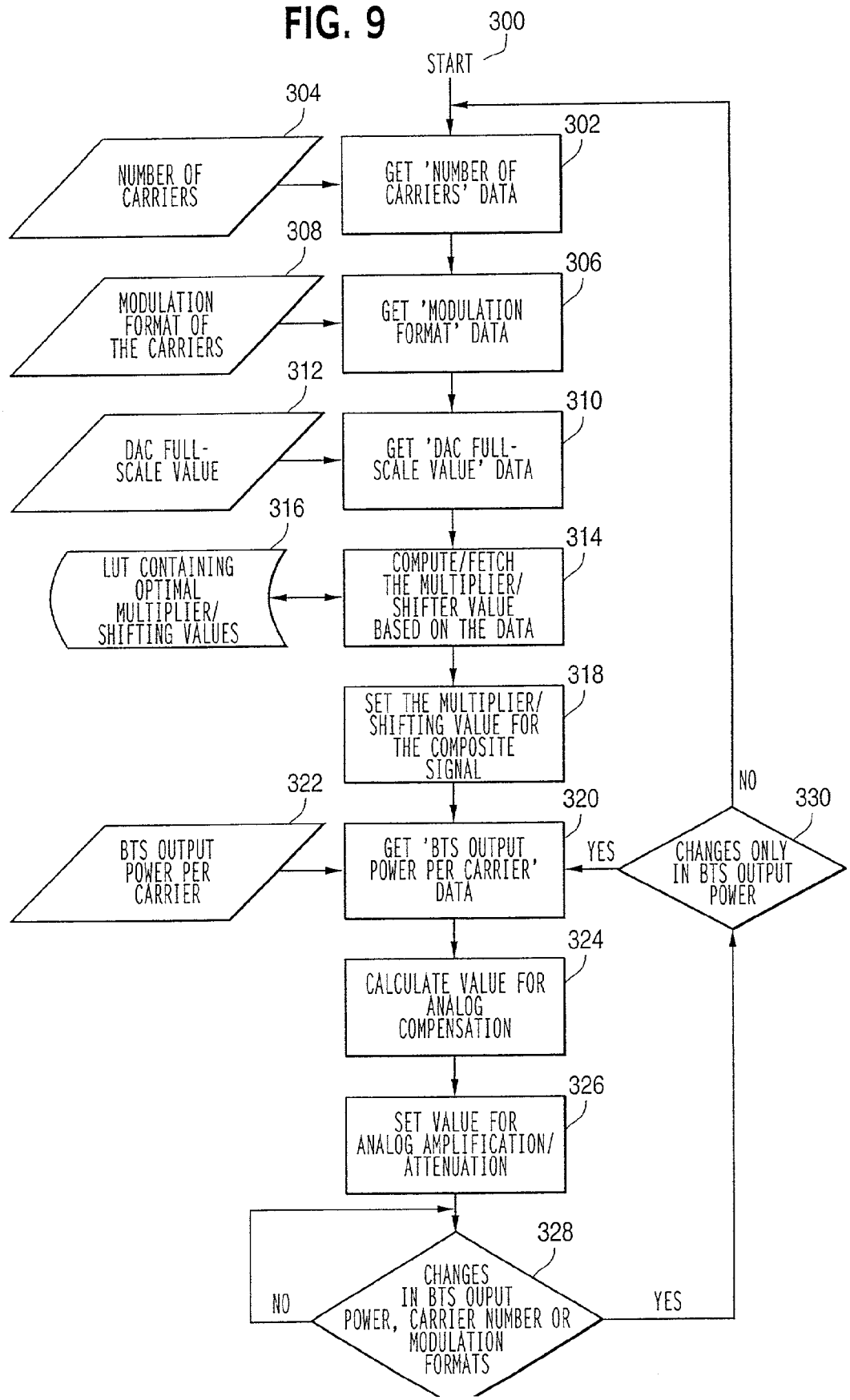
FIG. 9 illustrates a flowchart of the digital to analog converter scaling performed by the present invention.

FIG. 9 illustrates a flowchart of the operation of the digital scaler 102, the operation starts at point 300 and proceeds to point 302 to fetch a number of carriers which is provided by point 304. With respect to FIG. 4, the number of carriers M is equal to the number of digital signal sources 12 and the digital data signal modulators 14. Operation proceeds to point 306 at which the modulation format data, e.g. the type of modulation such as GSM, is fetched from point 308. Operation proceeds to point 310 where the full scale of the digital to analog converter 20 in terms of a number of bits is fetched from point 312. The digital to analog full scale value is typically a number of bits between 12 and 16 bits but the invention is not limited thereto. The operation proceeds to point 314 where a multiplier or shift value is either computed or fetched based upon diverse data sources which are obtained from a look-up table 316. For example, as illustrated, in FIG. 4, the actual digital multiplier or shift value is based upon the number of wanted carriers, and carrier characteristics, such as the characteristics of the carrier protocol format, e.g. GSM, is utilized to control the scaling value. Operation proceeds to point 318 where the value of the scaling performed by the digital scaler is set. Operation proceeds to point 320 where the base station output power per carrier data is obtained from point 322. Operation proceeds to point 324 where the value of the analog compensation, which is applied to RF gain control 106 to the attenuator 108, is calculated. Operation proceeds to point 326 where the value of analog amplification or attenuation provided by the attenuator 108 is set. Operation proceeds to decision point 328 where a determination is made if there is any change in the base station output power carrier number or modulation formats. If the answer is "no", the processing continues to loop at decision point 328 until a change is detected. If the answer is "yes", processing proceeds to decision point 330 where a determination is made if the changes are only to the base station output power. If the answer is "yes" at decision point 330, processing proceeds to point 320 as explained above. If the answer is "no", processing proceeds back to the block 302.

While the examples of shifting and multiplication provided by the digital scaler 102 are typically less than one, the digital scaling may be equal to one or greater than one. For example, digital scaling of greater than one occurs when the number of carriers is reduced which permits the power level to be increased.

While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. A transmission system which transmits an analog composite signal, including carriers which are respectively modulated with different digital data signal comprising:
 a signal combiner, responsive to the digital data signals, which provides an output of a combined digital signal representing combining of the digital data signals;
 a multiple carrier transmitter which transmits the analog composite signal;
 a digital to analog converter which converts a composite digital signal input into the analog composite signal, the digital to analog converter having a dynamic range of digital to analog conversion; and
 a digital scaler, responsive to the combined digital signal provided by the signal combiner, which provides the composite digital signal that is digital to analog converted by the digital to analog converter, the composite digital signal being a function of the combined digital signal provided by the signal combiner with a controlled magnitude which results in as much of the dynamic range of the digital to analog converter as possible being used during digital to analog conversion of the composite digital signal without clipping the composite digital signal.

2. A system in accordance with claim 1 comprising:
 a plurality of digital modulators, each digital modulator being coupled to a different one of the digital data signals and providing a digital carrier signal modulated with a different one of the digital data signals, the digital carrier signals being a function of the digital data signals combined by the signal combiner.

3. A system in accordance with claim 2 comprising:
 a power control, located between each digital modulator and the signal combiner, which controls a power level of the digital data signals which are provided to the signal combiner for combining thereof.

4. A system in accordance with claim 1 wherein the digital scaler comprises:
 a multiplier which multiplies the combined digital output signal by a scaling factor.

5. A system in accordance with claim 4 wherein:
 the scaling factor is less than one.

6. A system in accordance with claim 4 wherein:
 the scaling factor is greater than one.

7. A system in accordance with claim 1 wherein:
 the scaling factor is set selectively to equal one.

8. A system in accordance with claim 1 wherein:
 a bit shifter which scales the combined digital signal by a scaling factor by bit shifting the composite digital signal.

9. A system in accordance with claim 2 wherein the digital scaler comprises:
 a multiplier which multiplies the combined digital output signal by a scaling factor.

10. A system in accordance with claim 9 wherein:
 the scaling factor is less than one.

11. A system in accordance with claim 9 wherein:
 the scaling factor is greater than one.

12. A system in accordance with claim 9 wherein:
 the scaling factor is set selectively to equal one.

13. A system in accordance with claim 3 wherein the digital scaler comprises:
 a multiplier which multiplies the combined digital output signal by a scaling factor.

14. A system in accordance with claim 13 wherein:
 the scaling factor is less than one.

15. A system in accordance with claim 13 wherein:
 the scaling factor is greater than one.

16. A system in accordance with claim 13 wherein:
 the scaling factor is set selectively to equal one.

17. A system in accordance with claim 2 wherein:
 a bit shifter which scales the combined digital signal by a scaling factor by bit shifting the composite digital signal.

18. A system in accordance with claim 3 wherein:
 a bit shifter which scales the combined digital signal by a scaling factor by bit shifting the composite digital signal.

19. A system in accordance with claim 1 wherein:
 the controlled magnitude is a function of at least one of (1) a number of carriers used to transmit the digital data signals, (2) characteristics of an analog protocol used to transmit the analog composite signal, or (3) transmission power used for analog composite signal.

20. A system in accordance with claim 2 wherein:
 the controlled magnitude is a function of at least one of (1) a number of carriers used to transmit the digital data signals, (2) characteristics of an analog protocol used to transmit the analog composite signal, or (3) transmission power used for analog composite signal.

21. A system in accordance with claim 3 wherein:
 the controlled magnitude is a function of at least one of (1) a number of carriers used to transmit the digital data signals, (2) characteristics of an analog protocol used to transmit the analog composite signal, or (3) transmission power used for analog composite signal.

22. A system in accordance with claim 4 wherein:
 the controlled magnitude is a function of at least one of (1) a number of carriers used to transmit the digital data signals, (2) characteristics of an analog protocol used to transmit the analog composite signal, or (3) transmission power used for analog composite signal.

23. A system in accordance with claim 5 wherein:
 the controlled magnitude is a function of at least one of (1) a number of carriers used to transmit the digital data signals, (2) characteristics of an analog protocol used to transmit the analog composite signal, or (3) transmission power used for analog composite signal.

24. A system in accordance with claim 6 wherein:
the controlled magnitude is a function of at least one of (1) a number of carriers used to transmit the digital data signals, (2) characteristics of an analog protocol used to transmit the analog composite signal, or (3) transmission power used for analog composite signal.

25. A system in accordance with claim 7 wherein:
the controlled magnitude is a function of at least one of (1) a number of carriers used to transmit the digital data signals, (2) characteristics of an analog protocol used to transmit the analog composite signal, or (3) transmission power used for analog composite signal.

26. A system in accordance with claim 8 wherein:
the controlled magnitude is a function of at least one of (1) a number of carriers used to transmit the digital data signals, (2) characteristics of an analog protocol used to transmit the analog composite signal, or (3) transmission power used for analog composite signal.

27. A system in accordance with claim 9 wherein:
the controlled magnitude is a function of at least one of (1) a number of carriers used to transmit the digital data signals, (2) characteristics of an analog protocol used to transmit the analog composite signal, or (3) transmission power used for analog composite signal.

28. A system in accordance with claim 10 wherein:
the controlled magnitude is a function of at least one of (1) a number of carriers used to transmit the digital data signals, (2) characteristics of an analog protocol used to transmit the analog composite signal, or (3) transmission power used for analog composite signal.

29. A system in accordance with claim 11 wherein:
the controlled magnitude is a function of at least one of (1) a number of carriers used to transmit the digital data signals, (2) characteristics of an analog protocol used to transmit the analog composite signal, or (3) transmission power used for analog composite signal.

30. A system in accordance with claim 12 wherein:
the controlled magnitude is a function of at least one of (1) a number of carriers used to transmit the digital data signals, (2) characteristics of an analog protocol used to transmit the analog composite signal, or (3) transmission power used for analog composite signal.

31. A system in accordance with claim 13 wherein:
the controlled magnitude is a function of at least one of (1) a number of carriers used to transmit the digital data signals, (2) characteristics of an analog protocol used to transmit the analog composite signal, or (3) transmission power used for analog composite signal.

32. A system in accordance with claim 14 wherein:
the controlled magnitude is a function of at least one of (1) a number of carriers used to transmit the digital data signals, (2) characteristics of an analog protocol used to transmit the analog composite signal, or (3) transmission power used for analog composite signal.

33. A system in accordance with claim 15 wherein:
the controlled magnitude is a function of at least one of (1) a number of carriers used to transmit the digital data signals, (2) characteristics of an analog protocol used to transmit the analog composite signal, or (3) transmission power used for analog composite signal.

34. A system in accordance with claim 16 wherein:
the controlled magnitude is a function of at least one of (1) a number of carriers used to transmit the digital data signals, (2) characteristics of an analog protocol used to transmit the analog composite signal, or (3) transmission power used for analog composite signal.

35. A system in accordance with claim 17 wherein:
the controlled magnitude is a function of at least one of (1) a number of carriers used to transmit the digital data signals, (2) characteristics of an analog protocol used to transmit the analog composite signal, or (3) transmission power used for analog composite signal.

36. A system in accordance with claim 18 wherein:
the controlled magnitude is a function of at least one of (1) a number of carriers used to transmit the digital data signals, (2) characteristics of an analog protocol used to transmit the analog composite signal, or (3) transmission power used for analog composite signal.

37. A system in accordance with claim 1 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and
a gain control, responsive to the digital to analog conversion scaling control and to a power level of transmission of the analog composite signal, which controls the controlled level of attenuation of the analog composite signal provided by the attenuator.

38. A system in accordance with claim 37 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

39. A system in accordance with claim 2 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and
a gain control, responsive to the digital to analog conversion scaling control and to a power level of transmission of the analog composite signal, which controls the controlled level of attenuation of the analog composite signal provided by the attenuator.

40. A system in accordance with claim 39 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

41. A system in accordance with claim 3 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and a gain control, responsive to the digital to analog conversion scaling control and to a power level of transmission of the analog composite signal, which controls the controlled level of attenuation of the analog composite signal provided by the attenuator.

42. A system in accordance with claim 41 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

43. A system in accordance with claim 4 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and
a gain control, responsive to the digital to analog conversion scaling control and to a power level of transmission of the analog composite signal, which controls the controlled level of attenuation of the analog composite signal provided by the attenuator.

44. A system in accordance with claim 43 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

45. A system in accordance with claim 5 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and
a gain control, responsive to the digital to analog conversion scaling control and to a power level of transmission of the analog composite signal, which controls the controlled level of attenuation of the analog composite signal provided by the attenuator.

46. A system in accordance with claim 45 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

47. A system in accordance with claim 6 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and
a gain control, responsive to the digital to analog conversion scaling control and to a power level of transmission of the analog composite signal, which controls the controlled level of attenuation of the analog composite signal provided by the attenuator.

48. A system in accordance with claim 47 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

49. A system in accordance with claim 7 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and
a gain control, responsive to the digital to analog conversion scaling control and to a power level of transmission of the analog composite signal, which controls the controlled level of attenuation of the analog composite signal provided by the attenuator.

50. A system in accordance with claim 49 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

51. A system in accordance with claim 8 comprising:
an attenuator, coupled to the digital to analog converter and to the transmitter, which provides a controlled level of attenuation of the analog composite signal provided to the multiple carrier transmitter;
a digital to analog conversion scaling control which provides a control signal to the digital scaler which causes the composite digital signal to have the controlled magnitude; and
a gain control, responsive to the digital to analog conversion scaling control and to a power level of transmission of the analog composite signal, which controls the controlled level of attenuation of the analog composite signal provided by the attenuator.

52. A system in accordance with claim 51 wherein:
the control of the level of attenuation by the attenuator provided by the gain control is by RF gain control and is a function of a desired power level of the modulated carrier signals; and
the digital to analog conversion scaling control signal is a function of a modulation format and a number of the carriers which are present in the analog composite signal.

53. A system in accordance with claim 19 comprising:
an attenuator, coupled to the digital to analog converter and to the transmitter, which provides a controlled level of attenuation of the analog composite signal provided to the multiple carrier transmitter;

a digital to analog conversion scaling control which provides a control signal to the digital scaler which causes the composite digital signal to have the controlled magnitude; and a gain control, responsive to the digital to analog conversion scaling control and to a power level of transmission of the analog composite signal, which controls the controlled level of attenuation of the analog composite signal provided by the attenuator.

54. A system in accordance with claim 53 wherein:

the control of the level of attenuation by the attenuator provided by the gain control is by RF gain control and is a function of a desired power level of the modulated carrier signals; and the digital to analog conversion scaling control signal is a function of a modulation format and a number of the carriers which are present in the analog composite signal.

55. A method of transmitting an analog composite signal including carriers which are respectively modulated with different digital data signals comprising:

providing a combined digital signal which is a combination of the different digital data signals;

providing a composite digital signal which is a function of the combined digital signal with a controlled magnitude;

converting the composite digital signal from digital to analog which results in as much of a dynamic range of the digital to analog conversion as possible being used during digital to analog conversion of the composite digital signal without clipping the composite digital signal; and transmitting the analog composite signal from a multiple carrier transmitter.

56. A method in accordance with claim 55 comprising:

each digital carrier signal is modulated with a different one of the digital data signals and the digital carrier signals are a function of the digital data signals which are combined to provide the combined digital output signal.

57. A method in accordance with claim 55 comprising:

controlling a power level of the digital data signals which are combined.

58. A method in accordance with claim 55 wherein:

the controlled magnitude is provided by multiplying the combined digital output signal by a scaling factor.

59. A method in accordance with claim 58 wherein:

the scaling factor is less than one.

60. A method in accordance with claim 58 wherein:

the scaling factor is equal to one.

61. A method in accordance with claim 58 wherein:

the scaling factor is greater than one.

62. A method in accordance with claim 55 wherein:

the controlled magnitude is provided by bit shifting the composite digital signal.

63. A method in accordance with claim 55 wherein:

the controlled magnitude is a function of at least one of (1) a number of carriers used to transmit the digital data signals, (2) characteristics of an analog protocol used to transmit the analog composite signal, or (3) transmission power used for analog composite signal.

64. A method in accordance with claim 55 wherein:

the carriers are varied in number in proportion to a number of active mobiles to which the multiple carrier transmitter is transmitting and inversely proportional to a power level of transmission of each carrier.

* * * * *